United States Patent [19]

Medlin et al.

[11] Patent Number: 4,742,495
[45] Date of Patent: May 3, 1988

[54] ACOUSTIC ENERGY TRANSMITTER FOR BOREHOLE LOGGING

[75] Inventors: William L. Medlin, Dallas; Vasel R. Slover, Jr., Irving, both of Tex.

[73] Assignee: Mobil Oil Corporation, New York, N.Y.

[21] Appl. No.: 822,506

[22] Filed: Jan. 27, 1986

[51] Int. Cl.⁴ .......................... G01V 1/40; G01V 1/14
[52] U.S. Cl. ...................................... 367/31; 367/160; 367/162
[58] Field of Search ...................... 367/35, 34, 31, 163, 367/160, 159, 165, 161, 162, 171, 173; 181/106, 102, 401

[56] References Cited

U.S. PATENT DOCUMENTS

| | | | |
|---|---|---|---|
| Re. 24,446 | 3/1958 | Summers | 181/0.5 |
| 3,333,238 | 7/1967 | Caldwell | 340/18 |
| 3,362,011 | 1/1968 | Zemanek, Jr. | 340/18 |
| 3,363,118 | 1/1968 | Sims | 310/8.7 |
| 3,546,497 | 12/1970 | Craster | 367/160 X |
| 3,660,809 | 5/1972 | Pearson | 367/165 X |
| 3,706,967 | 12/1972 | Renna, Jr. | 367/159 |
| 4,051,455 | 9/1977 | Fowler | 367/163 X |
| 4,123,744 | 10/1978 | Ingram | 367/29 |
| 4,319,345 | 3/1982 | Dennis | 181/106 X |
| 4,383,308 | 5/1983 | Caldwell | 367/31 |
| 4,432,077 | 2/1984 | Alhilali et al. | 367/31 |
| 4,450,540 | 5/1984 | Mallet | 367/31 X |
| 4,516,228 | 5/1985 | Zemanek, Jr. | 367/160 X |
| 4,575,828 | 3/1986 | Williams | 367/31 |

FOREIGN PATENT DOCUMENTS 0127548  5/1984  European Pat. Off. ............. 367/35
3406445  8/1985  Fed. Rep. of Germany ........ 367/27

OTHER PUBLICATIONS

"Formation Compressional and Shear Interval-Transit-Time Logging by Means of Logging Spacing and Digital Techniques"; J. Aron et al., Feb. 1980, 53rd Annual Fall Technical Conference.

Primary Examiner—Thomas H. Tarcza
Assistant Examiner—Tod R. Swann
Attorney, Agent, or Firm—Alexander J. McKillop; Michael G. Gilman; George W. Hager, Jr.

[57] ABSTRACT

An acoustic transmitter for borehole logging includes a flexure disc acoustic source affixed to one end of an open-ended pipe. A rubber boot surrounds the pipe and flexure disc source and fluidly isolates them from the surrounding borehole fluid. Oil fills the rubber boot and pipe, such that the borehole fluid pressure is transmitted through the rubber boot to the oil. The flexure disc source is electrically excited to cause the transmitter to generate acoustic energy tube waves at one of the resonances of the flexure disc source within the seismic frequency range.

4 Claims, 7 Drawing Sheets

ACOUSTIC ENERGY TRANSMITTER FOR BOREHOLE LOGGING

BACKGROUND OF THE INVENTION

This invention relates to acoustic borehole logging and, more particularly, to an acoustic energy transmitter for generating acoustic energy tube waves in the seismic frequency range.

In acoustic borehole logging, an acoustic energy transmitter and one or more receivers disposed at spaced-apart distances from the transmitter are included in a borehole logging tool that is moved through a borehole. Acoustic energy waves generated by the transmitter travel through the subsurface formations surrounding the borehole and are detected by the receiver or receivers. One such borehole logging tool is described in U.S. Pat. No. 4,383,308 to R. L. Caldwell.

Typically, acoustic energy waves provided by conventional borehole logging tools include both head-waves and guided waves. A first arriving event is the headwave, commonly called a compressional wave, which represents acoustic energy which has been refracted through the formation adjacent the wellbore. This compressional wave travels as a fluid pressure wave in the wellbore mud from the transmitter to the formation where it travels at the compressional wave velocity of the particular formation. The compressional wave then travels to the receiver through the wellbore mud as a fluid pressure wave.

A second arriving event is the headwave, commonly called a shear wave, which is also refracted through the formation adjacent the wellbore. Unlike the compressional wave, the shear wave travels at shear velocity through the formations. The particles of the formation along the path of propagation are vibrated in a direction perpendicular to the direction of the propagation of the wave.

A third arriving event is the guided wave, commonly called a tube wave or Stoneley wave, which causes a radial bulging and contraction of the borehole, and its travel is by way of the borehole wall; that is, the boundary between the borehole fluids and the formation solids.

A fourth arriving event is the guided wave, commonly called a normal mode, pseudo-Rayleigh wave, or reflected conical wave. The travel of this normal mode is restricted to the borehole and has an oscillatory pattern normal to its direction of travel. Normally, the shear wave is indistinguishable from the onset of this normal mode due to concurrent arrival times.

Various signal timing and wave front analysis methods have been suggested for distinguishing between these various wave fronts received at a given receiver. Most of these methods involve timing circuits which anticipate the receipt of, and facilitate the collection of, such wave front information. For descriptions of various logging techniques for collecting and analyzing acoustic wave data, please refer to U.S. Pat. Nos. 3,333,238 (Caldwell); 3,362,011 (Zemanek, Jr.); Reissue No. 24,446 (Summers); and 4,383,308 (Caldwell).

Heretofore, well logging tools have transmitted such acoustic energy waves at frequencies of several kilohertz, while conventional seismic energy waves have been obtained at much lower frequencies of a few hundred hertz or less. It is a specific feature of the present invention to provide an acoustic transmitter for use in a borehole logging tool that will produce acoustic energy waves in the typical seismic frequency range of a few hundred hertz or less, particularly tube waves.

SUMMARY OF THE INVENTION

The present invention is directed to a method of acoustic well logging. A borehole is traversed with a well logging tool employing an acoustic transmitter for generating tube waves in the seismic frequency range.

More particularly, the acoustic transmitter includes a flexure disc acoustic source affixed to one end of an open-ended pipe. A rubber boot surrounds the pipe and flexure disc source and fluidly isolates them from the surrounding borehole fluid. Both the pipe and rubber boot are filled with an oil such that the borehole fluid pressure is transmitted through the rubber boot to the oil. The flexure disc source is electrically excited to cause the acoustic transmitter to generate acoustic energy waves at one of the resonances of the flexure disc source. Such electrical excitation is by means of tone bursts with a frequency near one of the resonances of the flexure disc source so that the acoustic transmitter resonates to generate tube waves in the seismic frequency range.

In a more specific aspect, the pipe and flexure disc source are mounted within a hollow cylindrical housing which is sealed at both ends by cap members. The rubber boot is positioned between such housing and the pipe and flexure disc source. The housing has a plurality of openings along its length to permit the borehole fluid pressure to be transmitted through the rubber boot to the oil inside the rubber boot and the pipe. At least one rod-like member extends through the inner cavity of the housing from one cap member to the other cap member. A mounting means is affixed to the rod-like member for supporting the pipe. At least a portion of the mounting means includes an acoustic insulating material for acoustically isolating the pipe and flexure disc source from the housing.

DESCRIPTION OF THE PREFERRED EMBODIMENT

Figure 1:
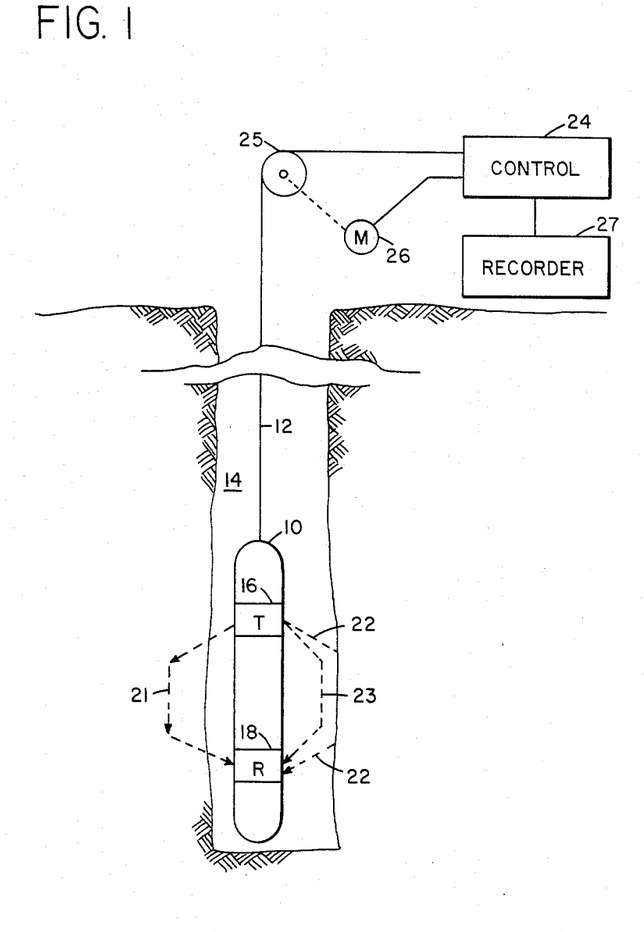
FIG. 1 is a diagrammatic representation of a borehole acoustic velocity logging system which may be utilized to generate acoustic energy waves in subsurface formations.

Referring now to FIG. 1, there will firstly be described a conventional borehole acoustic velocity logging system with which the low-frequency acoustic transmitter of the present invention may be utilized. The simplest acoustic logging system consists of a single transmitter and receiver. The logging tool 10 is suspended by cable 12 for movement along the length of the borehole 14. The logging tool includes an acoustic source or transmitter 16 for the production of repetitive time-spaced pulses of acoustic energy. One or more acoustic detectors or receivers 18 detects the generated acoustic pulses after their travel through the surrounding formations and converts them into representative electrical signals. The uphole components include a surface control unit 24 to which the cable 12 is directed over the sheave 25. A motor 26, which is controlled from the surface control unit 24, operates the sheave 25 for raising and lowering the logging tool 10 in the borehole 14. An output means, such as a digital recorder 27, is electrically connected to the surface control unit for recording and/or displaying the data detected from the logging tool 10. For more details and a more thorough understanding of the uphole recording of the acoustic waves detected by a borehole logging tool as shown in FIG. 1, reference may be made to U.S. Pat. Nos. 3,333,238 (Caldwell); 3,362,011 (Zemanek, Jr.); Re. No. 24,446 (Summers); and 4,383,308 (Caldwell).

Figure 2:
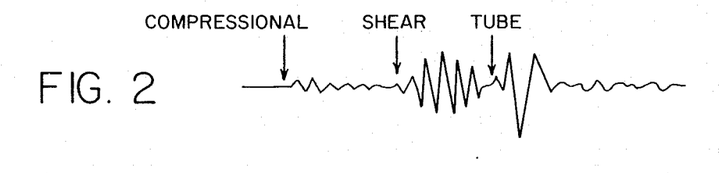
FIG. 2 illustrates a set of acoustic energy waveforms that are typically transmitted through subsurface formations surrounding a borehole as the logging tool of FIG. 1 is advanced through a borehole using a conventional acoustic source.

In carrying out the borehole logging operation, the logging tool 10 of FIG. 1 is initially lowered to the vicinity of the bottom 50 of the borehole 14. The conventional acoustic source of transmitter 16 is energized. Some of the generated acoustic energy will be received directly by the receiver 18 as compressional and shear waves by way of path 21 adjacent the borehole; as tube waves by way of path 22 along the borehole wall; and as the normal mode by way of path 23 within the borehole. FIG. 2 is representative of a set of such acoustic waveforms as they might be received by the receiver 18 as the logging tool is advanced through the borehole. Compressional and tube waves are identified as P and T waves, respectively. Since the shear wave is indistinguishable from the onset of the normal mode due to concurrent arrival times at the receiver, both are identified together as S waves in FIG. 2.

After the recording of these acoustic waves, the arrival times of selected ones of said waves is determined. The arrival time of a particular wave type at the same receiver changes slowly as the logging tool is advanced through the borehole. Thus, the arrival time at the current depth point is very close to the arrival time at the next successive depth point. It is desirable to carry out the borehole logging operation by advancing the tool at a speed such that the arrival time at the next depth point is always less than a half-wave period away. This defines the time window on the next trace within which to look for the wave type arrival.

Figure 3:
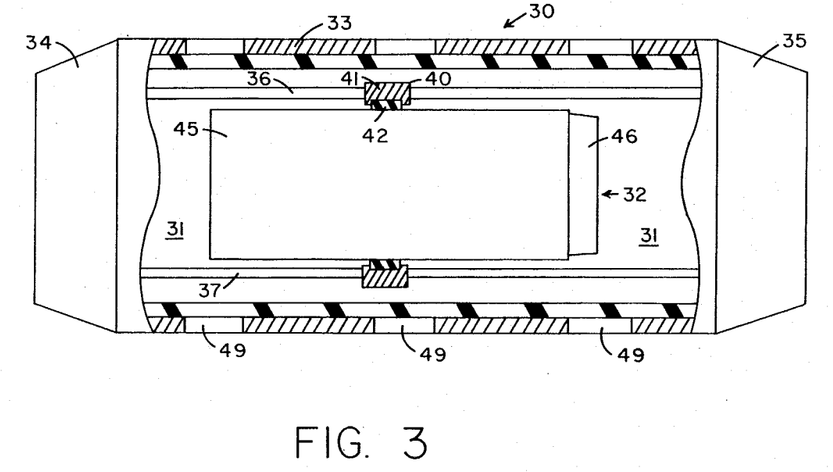
FIG. 3 is a detailed cross-sectional view of an acoustic transmitter employed in the logging tool of FIG. 1 to generate low-frequency tube waves in accordance with the present invention.

Having now described a borehole logging system with which the low-frequency acoustic transmitter of the present invention may be utilized, FIG. 3 may now be referred to along with the following description of such acoustic transmitter. The low frequency acoustic transmitter 30 comprises a hollow cylindrical housing 33 closed at both ends by cap members 34 and 35. Mounted within inner cavity 31 of housing 33 is a low-frequency acoustic transducer 32. A pair of rod-like members 36 and 37 extend through the inner cavity 31 between cap members 34 and 35. A mounting band 40 is affixed to the rod-like members 36 and 37 at the midpoint of the inner cavity 31. Mounting band 40 is in the form of a ring member 41 which is recessed internally to receive the rubber member 42. Mounted within the rubber member 42 is the acoustic transducer 32 which comprises the pipe 45 and flexure disc source 46. Running along the inside surface of the hollow cylindrical housing 33 is a rubber boot 47 which is held in place within cap members 34 and 35. Thus, the rubber boot 47 and cap members 34 and 35 fluidly seal the inner cavity of housing 33. The cylindrical housing 33 includes a plurality of slots 49 along its length so as to allow the rubber boot 47 to be exposed to the borehole fluid.

Figure 4:
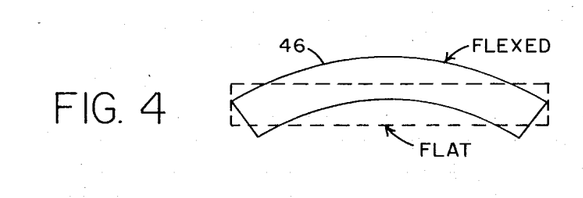
FIG. 4 illustrates the flexure motion of the acoustic energy source of the acoustic transmitter of FIG. 3 in producing low-frequency tube waves.

Referring now, more particularly, to the acoustic transducer 32, the pipe 45 is preferably a thin-walled steel pipe, about 1/16-inch thick, for example. Affixed to one end of such pipe is the flexure disc source 46. The other end of the pipe 45 is open to the inner cavity 31, both the pipe 45 and the cavity 31 being filled with oil, such as 10W oil. The flexure disc source 46 is preferably a pair of cylindrical or ring-like piezoelectric or electrostrictive elements coaxially mounted in spaced relationship within a solid base material. Each of the ring-like elements is provided with thin films of electrically conductive material on the inner and outer radial surfaces to which a changing electrical potential (not shown) is connected. These elements are polarized in the same direction and are deformed by the changing electrical potential. The change in shape of the source 46 may be preferably from a flat shape in the absence of the applied potential to a dish shape in the presence of the applied potential. The repetitive bending or flexing of the source 46 acts on the oil within the pipe 45 in a diaphragm-like action to produce the desired acoustic energy wave. One such flexure motion is illustrated in FIG. 4, the dashed lines indicating the flat shape of the source 46, and the solid line representing the flexed shape of source 46. A particularly suitable flexure disc source is that described in detail in U.S. Pat. No. 3,363,118 to C. C. Sims, the teaching of which is incorporated herein by reference.

Figure 5:
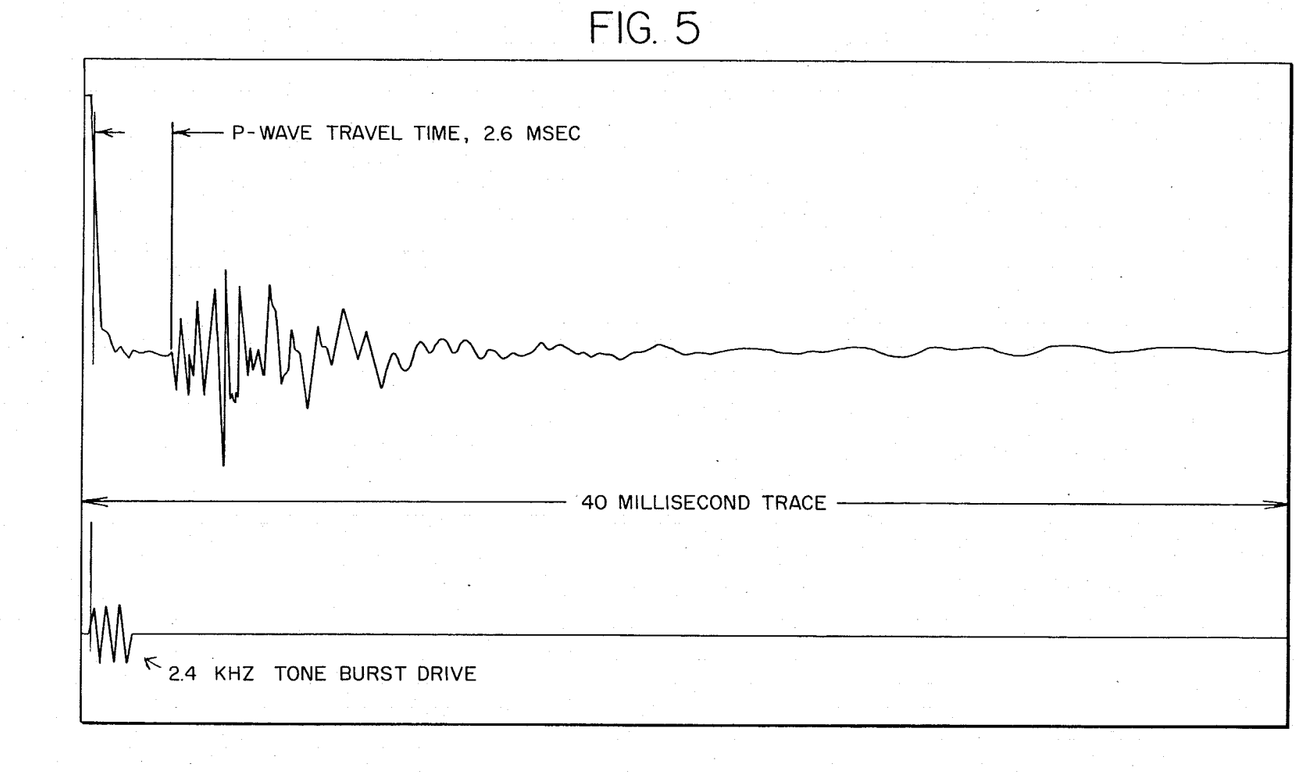
FIGS. 5 and 6 illustrate compressional waves generated within the borehole at 0.4 and 1.2 kHz, respectively, by the acoustic transmitter of FIG. 3.
Figure 6:
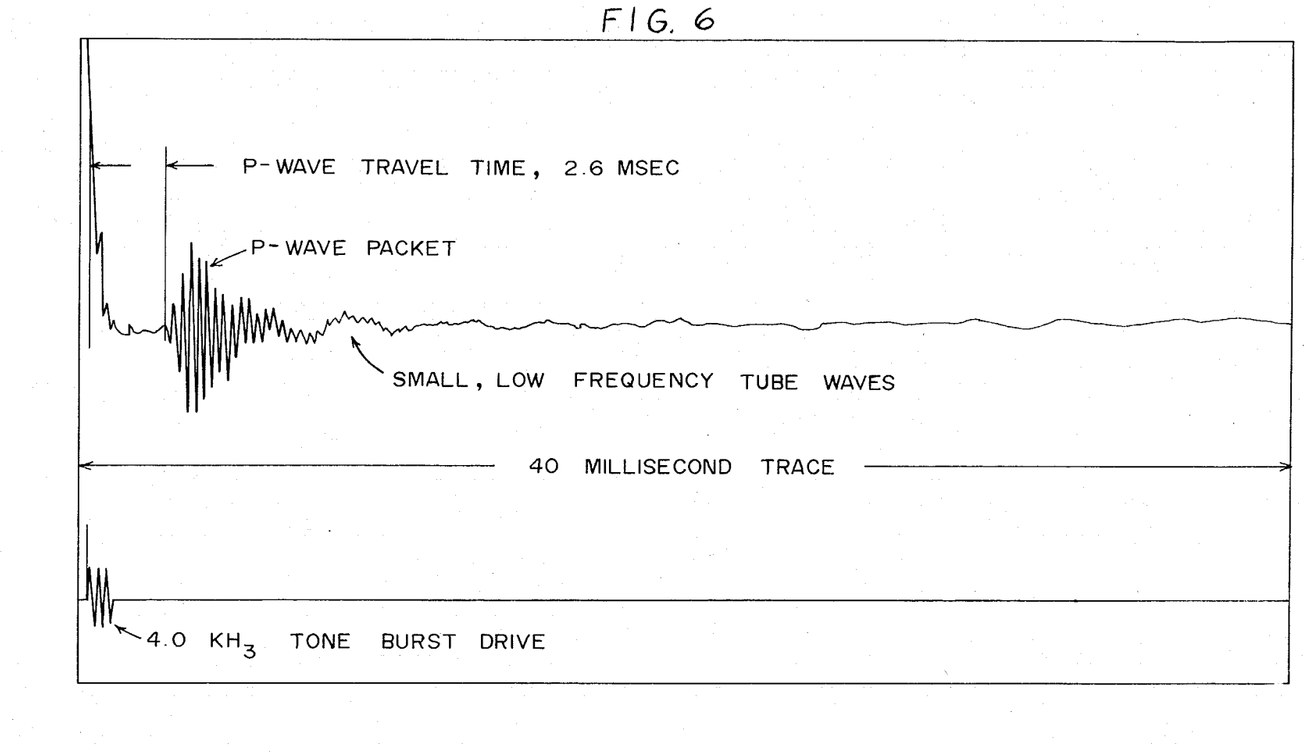
Figure 7:
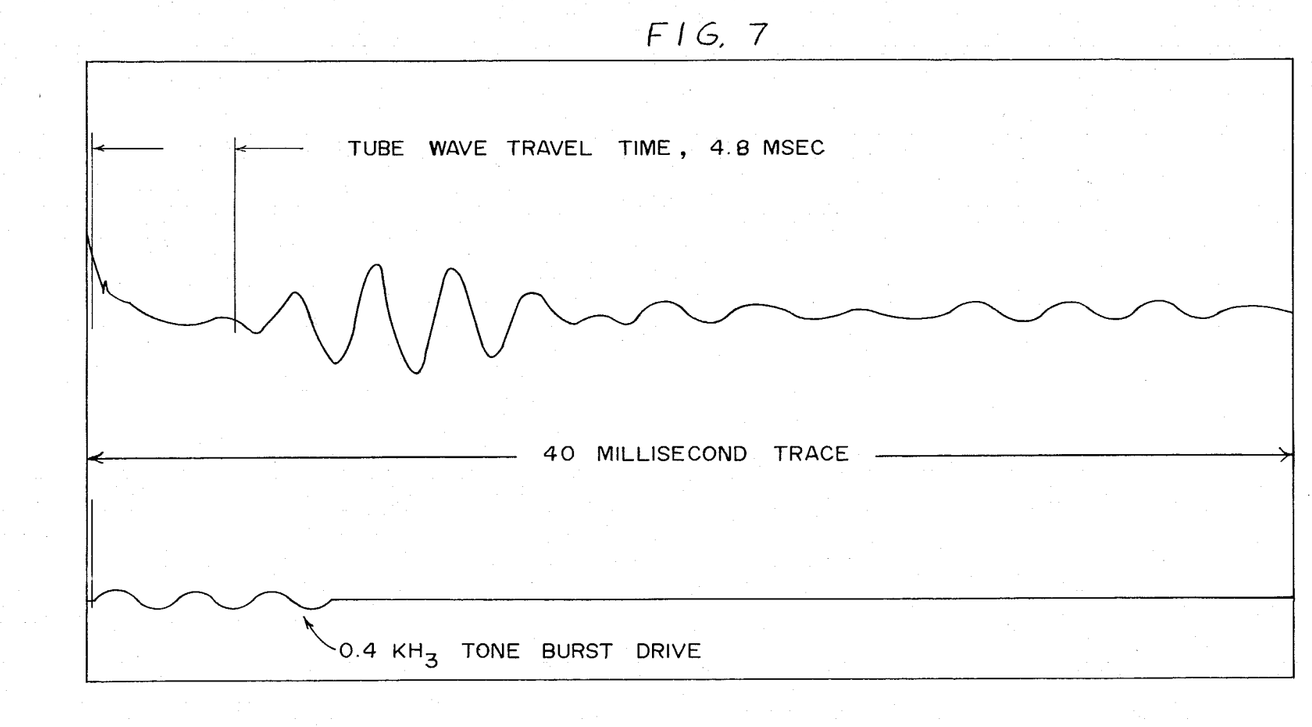
FIGS. 7 and 8 illustrate tube waves generated within the borehole at 2.4 and 4.0 kHz, respectively, by the acoustic transmitter of FIG. 3.
Figure 8:
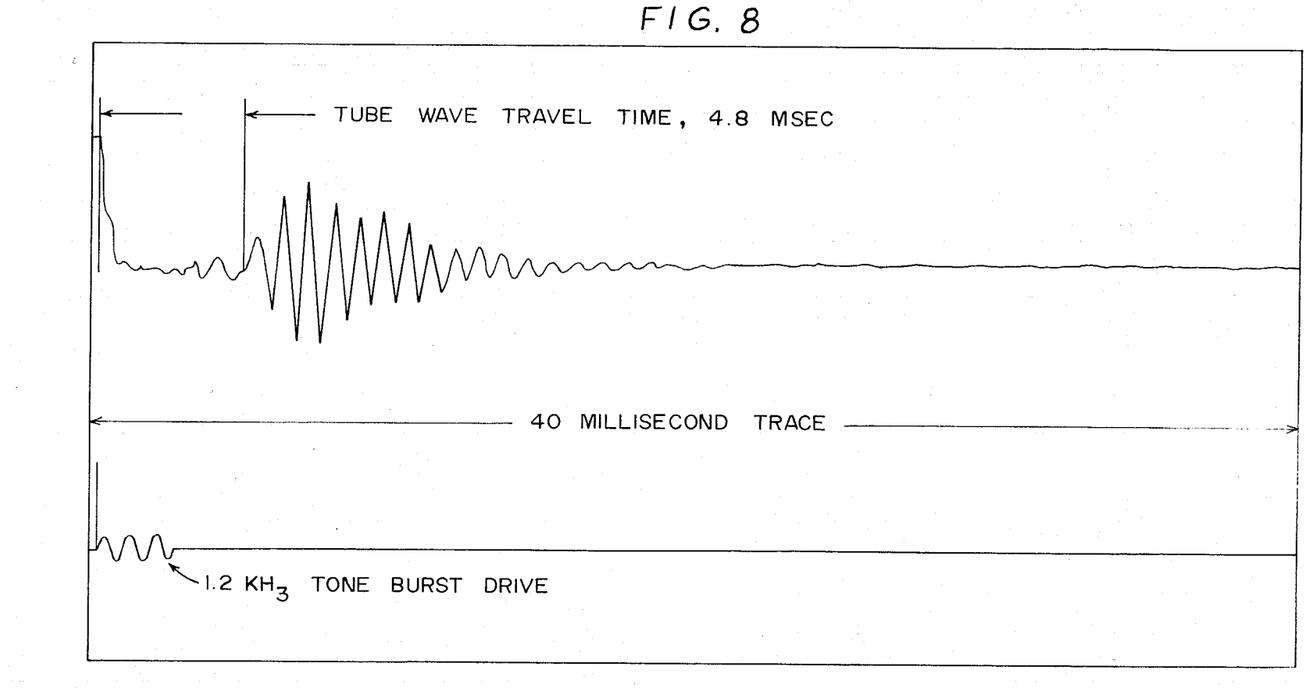

This combination of the oil-filled pipe 45 and the flexure disc source 46 generates tube waves in the seismic frequency range of from a few hundred hertz to a few kilohertz in the wellbore in which the borehole logging tool is utilized. The pipe 45 provides a resonance cavity into which the flexure disc source 46 provides its flexure motion. The oil filling the pipe 45 acts like an acoustic impedance coupled to the source 46. This coupling, or loading, of the oil to the source 46 provides for the desired low-frequency acoustic energy wave at one of the lower resonant frequencies of the source 46. The resonant frequencies are a function of the material, thickness and diameter of the ceramic source disc and its backing material. In one embodiment, the source 46 is a piezoelectric material with a diameter of about 3 inches and a thickness of about ½-inch. The pipe 45 is about 10 inches in length. For such embodiment, several low-frequency characteristic resonances were observed in a wellbore at 0.4 kHz, 1.2 kHz, 2.4 kHz, and 4.0 kHz. In response to the application of the exciting electrical potential, the source 46 will resonate at one of its characteristic resonance frequencies. At resonant frequencies of 2.4 and 4.0 kHz, compressional waves were generated within the wellbore, almost to the exclusion of tube waves, as illustrated in FIGS. 5 and 6. At 0.4 and 1.2 kHz, only tube waves were generated to the complete exclusion of compressional waves, as illustrated in FIGS. 7 and 8.

To control the resonant frequency of the source 46 so as to generate only a low-frequency tube wave, the source is preferably driven by a sine wave tone burst having the same frequency as that of the desired resonance, such as 0.5 or 1.2 kHz. This is a significant departure from conventional excitation methods wherein the acoustic source is excited by a sharp voltage or current spike which excites a plurality of resonance modes of vibration in the source which die out after a few cycles of vibration due to the high damping in the source.

To ensure proper vibration at one of the select resonant frequencies, the acoustic transducer 32 is suspended within the center of the cavity 31 from rod-like members 36 and 37 by means of the mounting band 40 surrounding the pipe 45 at a nodal point. In this way, the transducer 32 is acoustically isolated from the hollow cylindrical housing 33 and damping of the acoustic energy wave is minimized.

This hollow cylindrical member 33 is preferably a steel cylinder surrounding the rubber boot 47. The slots 49 in housing 33 allow the borehole fluid to contact the rubber boot 47. As the borehole tool is lowered into the borehole, an increase in borehole fluid pressure squeezes in the rubber boot 47, thereby causing the oil inside cavity 31 and pipe 45 to be compressed and to come to the same pressure as that of the borehole fluid.

Having now described the low-frequency acoustic transmitter of the present invention with a preferred embodiment for generating tube waves, it is to be understood that numerous modifications or alterations may be made without departing from the spirit and scope of the invention as set forth in the appended claims.

We claim:
1. A low-frequency acoustic transmitter for borehole logging, comprising:
    (a) a flexure disc acoustic source,
    (b) a pipe having one of its ends open and having said flexure disc acoustic source affixed to the other of its ends,
    (c) a hollow cylindrical housing,
    (d) a pair of cap members for sealing both ends of said housing,
    (e) at least one support member extending through the inner cavity of said housing,
    (f) a mounting means comprising an acoustic insulating material for affixing said pipe to said at least one support member so that damping of acoustic energy waves traveling along said pipe from said acoustic source are minimized.
    (g) a rubber boot positioned within said housing and surrounding said pipe and said affixed flexure disc acoustic source
    (h) oil filling said rubber boot so as to both surround and fill said pipe,
    (i) a plurality of openings along the length of said housing to permit the borehole fluid pressure to be transmitted through said rubber boot to the oil inside said pipe and said rubber boot, and
    (j) means for electrically exciting said flexure disc source with a tone burst having a frequency near that of the tube wave resonances of said flexure disc source to cause said source to provide a flexure motion into said oil-filled pipe, said pipe providing a resonance cavity and the oil within said pipe providing an acoustic impedance coupling to said flexure disc source so as to generate an acoustic energy tube wave at said resonance frequency.

2. The acoustic transmitter of claim 1 wherein said tone bursts have a frequency in the order of 0.4 kilohertz.

3. The acoustic transmitter of claim 1 wherein said tone bursts have a frequency in the order of 1.2 kilohertz.

4. The acoustic transmitter of claim 1 wherein said tone bursts are sine waves.

* * * * *